(12) United States Patent
Van Der Zee et al.

(10) Patent No.: US 11,578,699 B2
(45) Date of Patent: Feb. 14, 2023

(54) METHOD AND SYSTEM FOR TRANSPORTING WIND TURBINE BLADES

(71) Applicant: LM WIND POWER INTERNATIONAL TECHNOLOGY II APS, Kolding (DK)

(72) Inventors: Jacobus Van Der Zee, Kolding (DK); Anne Rothe Häkansson, Kolding (DK)

(73) Assignee: LM WIND POWER INTERNATIONAL TECHNOLOGY II APS, Kolding (DK)

( * ) Notice: Subject to any disclaimer, the term of this patent is extended or adjusted under 35 U.S.C. 154(b) by 102 days.

(21) Appl. No.: 16/956,276

(22) PCT Filed: Dec. 20, 2018

(86) PCT No.: PCT/EP2018/086293
§ 371 (c)(1),
(2) Date: Jun. 19, 2020

(87) PCT Pub. No.: WO2019/122186
PCT Pub. Date: Jun. 27, 2019

(65) Prior Publication Data
US 2020/0332771 A1    Oct. 22, 2020

(30) Foreign Application Priority Data
Dec. 21, 2017 (EP) ..................... 17209296

(51) Int. Cl.
*F03D 13/40* (2016.01)

(52) U.S. Cl.
CPC .......... *F03D 13/40* (2016.05); *F05B 2230/61* (2013.01); *F05B 2260/02* (2013.01)

(58) Field of Classification Search
CPC ... F03D 13/40; F05B 2230/61; F05B 2260/02
See application file for complete search history.

(56) References Cited

U.S. PATENT DOCUMENTS

| | | | |
|---|---|---|---|
| 2013/0104376 A1* | 5/2013 | Pedersen | F03D 80/00 29/525.02 |
| 2014/0353266 A1* | 12/2014 | Frederiksen | A47F 7/0021 211/60.1 |
| 2015/0300314 A1* | 10/2015 | Van Der Zee | A47B 47/0091 211/85.8 |
| 2015/0369209 A1 | 12/2015 | Datta et al. | |

(Continued)

FOREIGN PATENT DOCUMENTS

| | | |
|---|---|---|
| EP | 2 937 561 A1 | 10/2015 |
| WO | 2007/093854 A2 | 8/2007 |

(Continued)

*Primary Examiner* — Matthew P Travers
(74) *Attorney, Agent, or Firm* — Nath, Goldberg & Meyer; Jerald L. Meyer; Tanya E. Harkins

(57) ABSTRACT

Disclosed is a root clamping plate for a transportation system and a transportation system configured for transportation of a wind turbine. The root clamping plate comprising: a plurality of bolt holes and a resting face configured to engage with a receiver of a main root frame. The root clamping plate being configured to engage with a first element configured for a first transportation type, and the root clamping plate being configured to engage with a second element of a second transportation type.

12 Claims, 11 Drawing Sheets

(56) References Cited

U.S. PATENT DOCUMENTS

2018/0111750 A1* 4/2018 Klein ............... F03D 13/40
2018/0178708 A1* 6/2018 Stuart ............... B60P 7/12
2018/0223811 A1* 8/2018 Fletcher ............ B61D 45/003

FOREIGN PATENT DOCUMENTS

WO  2011/131254 A2  10/2011
WO  2012/003831 A2  1/2012

* cited by examiner

METHOD AND SYSTEM FOR TRANSPORTING WIND TURBINE BLADES

This is a National Phase Application filed under 35 U.S.C. 371 as a national stage of PCT/EP2018/086293, filed Dec. 20, 2018, an application claiming the benefit of European Application No. 17209296.7, filed Dec. 21, 2017, the content of each of which is hereby incorporated by reference in its entirety.

FIELD OF THE INVENTION

The present disclosure relates to a transportation system and/or storage system for a wind turbine blade and in particular to elements of such system.

BACKGROUND

Wind turbine blades used for horizontal axis wind turbines for generating electrical power from wind can be rather large and may exceed 70 metres in length and 4 metres in width. The blades are typically made from a fibre-reinforced polymer material and comprise an upwind shell part and a downwind shell part.

Often, transporting wind turbine blades from the production facility to the site of wind turbine or the wind turbine power plant requires many transportation steps. Typically, the blades are transported by truck, train or ship and again by truck to the site of the wind power plant. Additionally, reloading between the different types of transportation is needed. Finally, the blades are stored at the production facility and at the site of the wind turbine power plant.

Due to the size and fragility of these large rotor blades, the blades may be damaged during transport as well as during loading and unloading. Such damages may seriously degrade the performance of the blades. Therefore, the blades need to be carefully packaged in order to ensure that they are not damaged.

However, due to the increasing length of modern wind turbine blades, it is gradually becoming more complicated and expensive to transport the blades. It is not uncommon that the transportation costs amount to 20 percent or even higher of the total costs for manufacturing, transporting and mounting the wind turbine blade on the rotor of a wind turbine blade. In addition, some blades are transported to the erection site through different modes of transport, such as by truck, train and ship. Some of these modes of transports may have restrictions on large loads, maximum heights, maximum widths, maximum distances between transport frames or supports, for instance dictated by local regulations.

Overall, there is a demand for making transport solutions simpler, safer and cheaper. In particular, there is a demand for making such systems more flexible

SUMMARY

It is an object of the present disclosure to provide a transportation and/or storage system for wind turbine blades which overcomes or ameliorates at least one of the disadvantages of the prior art or which provides a useful alternative.

In particular, it is an object of the present invention to provide a more flexible transport solution that is able to accommodate for different transport situations and regulatory requirements.

It is another object of the present invention to provide a transport and/or storage solution that is simple and cost-efficient.

The present disclosure relates to a root clamping plate for a transportation system, a transportation system configured for transportation of a wind turbine, and a method of transportation of a wind turbine blade. The root clamping plate comprising: a plurality of bolt holes and a resting face configured to engage with a receiver of a main root frame. The root clamping plate being configured for a first transportation type, such as configured to engage with a first element configured of a first transportation type, and the root clamping plate being configured for a second transportation type, such as configured to engage with a second element of a second transportation type.

Disclosed is a root clamping plate, such as a first root clamping plate and/or a second root clamping plate, for a transportation system configured for transportation of a wind turbine blade, such as a wind turbine blade having a longitudinal axis and comprising a root end, a root region, an airfoil region with a tip, a pressure side, a suction side and a chord line extending between a leading edge and a trailing edge.

The root end, such as the root end surface of the root end, comprises bolt attachments distributed along a bolt circle having a bolt circle diameter, e.g. BCD.

The root clamping plate extends in a plate plane and comprising: a plurality of bolt holes and a resting face.

The plurality of bolt holes is arranged along a circular arc from a primary bolt hole to a secondary bolt hole. The circular arc has a diameter being the same as the bolt circle diameter. A radius of the circular arc may be the same as a radius of the bolt circle of bolt attachments of the root end. The plurality of bolt holes are configured for attachment of the root clamping plate to a root end part of the root end, such as a first root end part and/or a second root end part of the root end. For example, such that the longitudinal axis of the wind turbine blade is substantially perpendicular to the plate plane.

The resting face is configured to engage with a receiver of a main root frame.

The root clamping plate is configured for a first transportation type, such as configured to engage with a first element configured of a first transportation type, and the root clamping plate is configured for a second transportation type, such as configured to engage with a second element of a second transportation type Also disclosed is transportation system for transportation of a wind turbine blade having a longitudinal axis and comprising a root end, a root region, an airfoil region with a tip, a pressure side, a suction side and a chord line extending between a leading edge and a trailing edge. The root end, such as a root end surface of the root end, comprises bolt attachments distributed along a bolt circle having a bolt circle diameter, e.g. BCD.

The root end may comprise a first root end part on a first side of a vertical diameter of the bolt circle and below a horizontal diameter of the bolt circle. The root end may comprise a second root end part on a second side, e.g. opposite the first side, of the vertical diameter of the bolt circle and below the horizontal diameter of the bolt circle. The first root end part and the second root end part may be separated, e.g. by more than 5 degrees, such as more than 10 degrees, such as more than 15 degrees, such as more than 20 degrees.

The transportation system comprises a first root clamping plate and a second root clamping plate.

The first root clamping plate extends in a first plate plane and comprises a first plurality of bolt holes and a first resting face.

The first plurality of bolt holes is arranged along a first circular arc from a first primary bolt hole to a first secondary bolt hole. The first circular arc has a diameter being the same as the bolt circle diameter. A radius of the first circular arc may be the same as a radius of the bolt circle of bolt attachments of the root end. The first plurality of bolt holes is configured for attachment of the first root clamping plate to a first root end part of the root end. For example, such that the longitudinal axis of the wind turbine blade is substantially perpendicular to the first plate plane.

The first resting face is configured to engage with a first receiver of a main root frame.

The second root clamping plate extends in a second plate plane and comprises a second plurality of bolt holes and a second resting face:

The second plurality of bolt holes is arranged along a second circular arc from a second primary bolt hole to a second secondary bolt hole. The second circular arc has a diameter being the same as the bolt circle diameter. A radius of the second circular arc may be the same as a radius of the bolt circle of bolt attachments of the root end. The second plurality of bolt holes is configured for attachment of the second root clamping plate to a second root end part of the root end. For example, such that the longitudinal axis of the wind turbine blade is substantially perpendicular to the second plate plane.

The second resting face is configured to engage with a second receiver of the main root frame.

The transportation system is configured for a first transportation type, such as configured to engage with a first element configured of a first transportation type, and the transportation system is configured for a second transportation type, such as configured to engage with a second element of a second transportation type. In particular the root clamping plate(s), such as the first root clamping plate and/or the second root clamping plate may be configured for continuous attachment to the root end of the wind turbine blade throughout changes between transportation types, such as throughout transport of the wind turbine blade from the manufacturing site to installation site.

Thus, adaption to certain transportation situations may be provided, e.g. the root clamping plate may be installed on the root end of the wind turbine blade after manufacturing, and may be used during different mode of transportation, such as both in road transport and sea transport. Thus, the present disclosure provides for a more flexible shifting between modes of transportation, e.g. from road transport to sea transport, and vice versa.

Also disclosed is a method of transportation of a wind turbine blade having a longitudinal axis and comprising a root end, a root region, an airfoil region with a tip, a pressure side, a suction side and a chord line extending between a leading edge and a trailing edge. The root end comprising bolt attachments distributed along a bolt circle having a bolt circle diameter. The method comprising: Attaching a first root clamping plate to a first root end part of the root end; attaching a second root clamping plate to a second root end part of the root end; engaging the first root clamping plate and the second root clamping plate with a first transportation type; transporting the wind turbine blade by the first transportation type; disengaging the first root clamping plate and the second root clamping plate from the first transportation type; and engaging the first root clamping plate and the second root clamping plate with a second transportation type.

Attaching the first root clamping plate and/or the second root clamping plate to the root end may be performed at a production facility for the wind turbine blade, e.g. immediately after finalising production of the wind turbine blade.

The method may further comprise transporting the wind turbine blade by the second transportation type.

It is envisaged that any embodiments or elements as described in connection with any one aspect may be used with any other aspects or embodiments, mutatis mutandis. For example, the disclosed root clamping plate and any features described in relation to a root clamping plate may apply to the first and/or second root clamping plate of the disclosed transportation system.

It is an advantage of the disclosure that a method of transportation, a transportation system and components of a transportation system are disclosed, which may facilitate reduction of weight of the transportation system, essentially allowing transportation of heavier wind turbine blades within weight limitations set by authorities.

It is a further advantage of the present disclosure, that transportation involving a plurality of transportation types, such as road transport and sea transport, is made easier by reducing the need for dismounting transportation components upon change of transportation type.

The plurality of bolt holes of the root clamping plate, such as the first plurality of bolt holes of the first root clamping plate and/or the second plurality of bolt holes of the second root clamping plate, may be arranged along a circular arc, such as the first circular arc and/or the second circular arc. The circular arc may extend less than 45 degrees from the primary bolt hole to the secondary bolt hole, such as less than 30 degrees, such as less than 20 degrees, e.g. of the bolt circle diameter. The first circular arc may extend less than 45 degrees from the first primary bolt hole to the first secondary bolt hole, such as less than 30 degrees, such as less than 20 degrees, e.g. of the bolt circle diameter. The second circular arc may extend less than 45 degrees from the second primary bolt hole to the second secondary bolt hole, such as less than 30 degrees, such as less than 20 degrees, e.g. of the bolt circle diameter.

Each of the plurality of bolt holes may extend through the root clamping plate, e.g. perpendicularly to the plate plane. For example, each of the first plurality of bolt holes may extend through the first root clamping plate, e.g. perpendicularly to the first plate plane, and/or each of the second plurality of bolt holes may extend through the second root clamping plate, e.g. perpendicularly to the second plate plane. For example, such that a root clamping plate, such as the first root clamping plate and/or the second root clamping plate, is attachable to a first root end part of the root end in a first orientation and a second root end part of the root end in a second orientation. For example, the root clamping plate may be flipped over to be attached to the second root end part.

The root clamping plate, such as the first root clamping plate and/or the second root clamping plate may have a primary distance from the primary bolt hole to the resting face and a secondary distance from the secondary bolt hole to the resting face. The primary distance may be longer than the secondary distance. The first root clamping plate may have a first primary distance from the first primary bolt hole to the resting face and a first secondary distance from the first secondary bolt hole to the resting face. The first primary distance may be longer than the first secondary distance. The second root clamping plate may have a second primary distance from the second primary bolt hole to the resting face and a second secondary distance from the second secondary bolt hole to the resting face. The second primary distance may be longer than the second secondary distance. The first primary distance and the second primary distance may be the same. The first secondary distance and the second secondary distance may be the same.

The root clamping plate, such as the first root clamping plate and/or the second root clamping plate, may comprising a secondary plurality of bolt holes arranged along a secondary circular arc from a primary bolt hole to a secondary bolt hole. The secondary circular arc may have a diameter other than the diameter of the circular arc. Providing a secondary plurality of bot holes may provide for the root clamping plate being used for different wind turbine blades having different bolt circle diameters.

The first transportation type may be road transport, such as dolly transport and/or extendable trailer transport. Alternatively, the first transportation type may be sea transport, such as stackable sea transport.

The second transportation type may be road transport, such as dolly transport and/or extendable trailer transport. Alternatively, the second transportation type may be sea transport. Sea transport may be stackable sea transport.

The second transportation type may be different than the first transportation type. For example, the first transportation type may be dolly transport and the second transportation type may be extendable trailer transport or sea transport. Alternatively, the first transportation type may be extendable trailer transport and the second transportation type may be dolly transport or sea transport. Alternatively or additionally, the first transportation type may be road transport and the second transportation type may be sea transport.

The root clamping plate, such as the first root clamping plate and/or the second root clamping plate, may be a rigid structure. For example, the root clamping plate may be made of stainless steel. The root clamping plate may have a thickness perpendicular to the plate plane between 40-100 mm, such as between 50-80 mm, such as between 55-65 mm, such as 60 mm.

Also disclosed is a main root frame. For example, the transportation system may comprise the main root frame.

The main root frame may comprise a first receiver, such as the first receiver for receiving the first resting face of the first root clamping plate. The main root frame may comprise a second receiver, such as the second receiver for receiving the second resting face of the second root clamping plate. The main root frame may comprise a main connector connecting the first receiver and the second receiver.

A receiver of the main root frame may comprise a bottom surface and a wall surface. For example, the first receiver may comprise a first bottom surface and a first wall surface, and/or the second receiver may comprise a second bottom surface and a second wall surface.

The wall surface may be limiting movement perpendicular to the plate plane of the received root clamping plate. For example, the first wall surface may be limiting movement perpendicular to the first plate plane of the received first root clamping plate and/or the second wall surface may be limiting movement perpendicular to the second plate plane of the received second root clamping plate.

The wall surface may allow a limited tilting of the received root clamping plate, e.g. about an axis in the plate plane, e.g. a substantial horizontal axis. For example, the first wall surface may allow a limited tilting of the received first root clamping plate, e.g. about an axis in the first plate plane, e.g. a substantial horizontal axis, and/or the second wall surface may allow a limited tilting of the received second root clamping plate, e.g. about an axis in the second plate plane, e.g. a substantial horizontal axis. The first wall surface and the second wall surface may allow substantially the same amount of tilting. The limited tilting may be between 0.1-15 degrees, such as between 0.5-10 degrees, such as between 1-5 degrees. The limited tilting may be measured with respect to vertical.

During transport, the middle of the blade may, e.g. due to the flexibility of the blade, move significantly up and down, e.g. 1 meter of vertical travel of the middle of the blade is not uncommon. Such vertical movement will translate to a torque about the line of attachment at the root end. Allowing a minor tilting motion, about the line of attachment, e.g. between the clamping plate(s) and the main root frame, will significantly reduce the torque transferred to structures whereto the main root frame is attached, such as the truck towing the wind turbine blade or stackable frames used for storage or sea transport.

The root clamping plate may comprise a lock hole. For example, the first root clamping plate may comprise a first lock hole, and/or the second root clamping plate may comprise a second lock hole. The lock hole(s) may be configured for securing the respective root clamping plate to the receiver of the main root frame. For example, the first lock hole may be configured for securing the first root clamping plate to the first receiver of the main root frame and/or the second lock hole may be configured for securing the second root clamping plate to the second receiver of the main root frame.

The wall surface of the receiver may comprise a receiver lock hole, e.g. configured for securing the received root clamping plate to the receiver. For example, the first wall surface may comprise a first receiver lock hole, e.g. configured for securing the received first root clamping plate to the first receiver, and/or the second wall surface may comprise a second receiver lock hole, e.g. configured for securing the received second root clamping plate to the second receiver.

A locking pin may be inserted through the receiver lock hole and a lock hole of the received root clamping plate. For example, a first locking pin may be inserted through the first receiver lock hole and the first lock hole of the received first root clamping plate, and/or a second locking pin may be inserted through the second receiver lock hole and the second lock hole of the received second root clamping plate.

The main root frame may be configured to be fastened to an extendable trailer and/or configured to be fastened to a root frame, e.g. for sea transport, such as a stackable root frame.

The main root frame may comprise one or more shackles, such as a plurality of shackles, configured for fastening the main root frame to an element of a transportation type, such as an extendable trailer for road transport and/or a root frame for sea transport.

The main root frame may be configured to provide stiffening. For example, when the transportation system is used for dolly transport.

The root clamping plate may comprise a connector receiver, e.g. configured for connection of a clamp connector, such as a clamp connector configured to be mounted on a truck for dolly transport of the wind turbine blade. For example, the first root clamping plate may comprise a first connector receiver, e.g. configured for connection of a first clamp connector, and/or the second root clamping plate may comprise a second connector receiver, e.g. configured for connection of a second clamp connector. The first clamp connector and/or the second clamp connector may be configured to be mounted on a truck for dolly transport of the wind turbine blade.

The connector receiver, such as the first connector receiver and/or the second connector receiver, may be formed by a through hole, e.g. substantially perpendicular to the plate plane. The through hole may have a rectangular shape in the plate plane. Alternatively, the through hole may have an oval shape in the plate plane, a triangular shape, or an arbitrary shape in the plate plane. For example, the through hole may be asymmetric in the plate plane.

Also disclosed is a clamp connector, such as a first clamp connector and a second clamp connector, configured to be mounted on a truck for dolly transport of the wind turbine blade, such as on a truck adaptor for dolly transport of the wind turbine blade. The transportation system may comprise the first clamp connector and/or the second clamp connector.

The first clamp connecter may be configured for connection to a first connector receiver of the first root clamping plate. The second clamp connector may be configured for connection to a second connector receiver of the second root clamping plate.

A clamp connecter may have an upper edge with an indentation. The clamp connector may be configured to engage a connector receiver, e.g. such that the indentation is aligned with the root clamping plate, such as the plate plane of the root clamping plate. For example, the first clamp connecter may have an upper edge with a first indentation. The first clamp connector may be configured to engage the first connector receiver, e.g. such that the first indentation is aligned with the first root clamping plate, such as the first plate plane of the first root clamping plate. Alternatively or additionally, the second clamp connecter may have an upper edge with a second indentation. The second clamp connector may be configured to engage the second connector receiver, e.g. such that the second indentation is aligned with the second root clamping plate, such as the second plate plane of the second root clamping plate.

Also disclosed is an upper support bar configured to be mounted between a truck adaptor for dolly transport and a third root end part and/or a fourth root end part of the root end. The transportation system may comprise the upper support bar. The upper support bar may allow for providing force, e.g. push or pull, to the upper part of the wind turbine blade along the longitudinal axis, e.g. such as to change the angle of the wind turbine blade during transport. Alternatively or additionally, the upper support bar may be used for handling of the wind turbine blade, such as lifting or turning.

Also disclosed is a tip clamping element, e.g. configured for attaching to the airfoil region of the wind turbine blade. The transportation system may comprise a tip clamping element. The method may comprise attaching a tip clamping element to the airfoil region of the wind turbine blade. The tip clamping element may be configured for the first transportation type, and the tip clamping element may be configured for the second transportation type.

The tip clamping element may comprise an upper clamping part and/or a lower clamping part. The lower clamping part and the upper clamping part may be releasably connected to enclose a blade clamp part of the airfoil region of the wind turbine blade. For example, the lower clamping part and the upper clamping part may be releasably connected, e.g. by use of a locking pin, bolts or similar, in one side and/or hingedly connected in the opposite side.

A clamping part of the tip clamping element may comprise an insert receiver, e.g. configured to receive an insert being formed to accommodate a contour of the blade clamp part. For example, the lower clamping part may comprise a lower insert receiver, e.g. configured to receive a lower insert being formed to accommodate a lower contour of the blade clamp part. Alternatively or additionally, the upper clamping part may comprise an upper insert receiver, e.g. configured to receive an upper insert being formed to accommodate an upper contour of the blade clamp part. Providing a clamping part with an insert receiver may provide that the same clamping part may be used for different wind turbine blades, e.g. having different contours at the blade clamp part. An insert, such as the lower insert and/or the upper insert may be made of a plastic material, such as polyurethane.

Also disclosed is a tip frame, such as a tip frame for attachment of the tip clamping element. The transportation system may comprise the tip frame. The tip frame may have a base tip element. The tip frame may have a first vertical tip element. The tip frame may have a second vertical tip element. The tip frame may have a third vertical tip element. The tip frame may have a fourth vertical tip element.

The vertical tip elements, such as the first vertical tip element and/or the second vertical tip element and/or the third vertical tip element and/or the fourth vertical tip element, may extend vertically from the base tip element.

The vertical tip elements, such as the first vertical tip element and/or the second vertical tip element and/or the third vertical tip element and/or the fourth vertical tip element, may have a plurality of attachment positions including a first attachment position and a second attachment position. The plurality of attachment positions may be configured for attachment of the tip clamping element. The first attachment position may be at a first height. The second attachment position may be at a second height. The second height may be above the first height.

The tip frame may be configured for stacking. For example, the tip frame may be configured to be positioned on top of another frame, such as another root frame or another tip frame. Alternatively or additionally, the tip frame may be configured to receive another frame, such as another root frame or another tip frame, positioned on top of the tip frame.

The tip frame may comprise a top tip element. The first vertical tip element and/or the second vertical tip element may extend vertically to the top tip element, such as from the base tip element to the top tip element. The top tip element may be configured to receive a base tip element of another tip frame, on top of the top tip element. Alternatively or additionally, the top tip element may be configured to receive a base root element of a root frame on top of the top tip element.

Also disclosed is a root frame, such as root frame for attachment of the root clamping plate(s) and/or the main root frame. The transportation system may comprise the root frame. The root frame may have a base root element. The root frame may have a first vertical root element. The root frame may have a second vertical root element. The root frame may have a third vertical root element. The root frame may have a fourth vertical root element.

The main root frame and/or a root clamping plate, such as the first root clamping plate and/or the second root clamping plate, may be configured to be fastened to the base root element.

The first vertical root element and/or the second vertical root element and/or the third vertical root element and/or the fourth vertical root element may extend vertically from the base root element.

The root frame may be configured to be positioned on top of another frame, such as another root frame and/or another tip frame. Alternatively or additionally the root frame may be configured to receive another frame, such as another root frame and/or another tip frame, positioned on top of the root frame.

The root frame may comprise a top root element. The first vertical root element and/or the second vertical root element and/or the third vertical root element and/or the fourth vertical root element may extend vertically to the top root element, such as from the base root element to the top root element. The top root element may be configured to receive a base tip element of a tip frame on top of the top root element. Alternatively or additionally, the top root element may be configured to receive a base root element of another root frame on top of the top root element.

The disclosed elements may also be used in storage of the wind turbine blade, such as stackable storage. For example, the disclosed root frame and/or tip frame may be used to stack a plurality of wind turbine blades, using the disclosed transportation system for storage of the plurality of wind turbine blades.

BRIEF DESCRIPTION OF THE FIGURES

Embodiments of the disclosure will be described in more detail in the following with regard to the accompanying figures. The figures show one way of implementing the present invention and are not to be construed as being limiting to other possible embodiments falling within the scope of the attached claim set.

DETAILED DESCRIPTION

Figure 1:
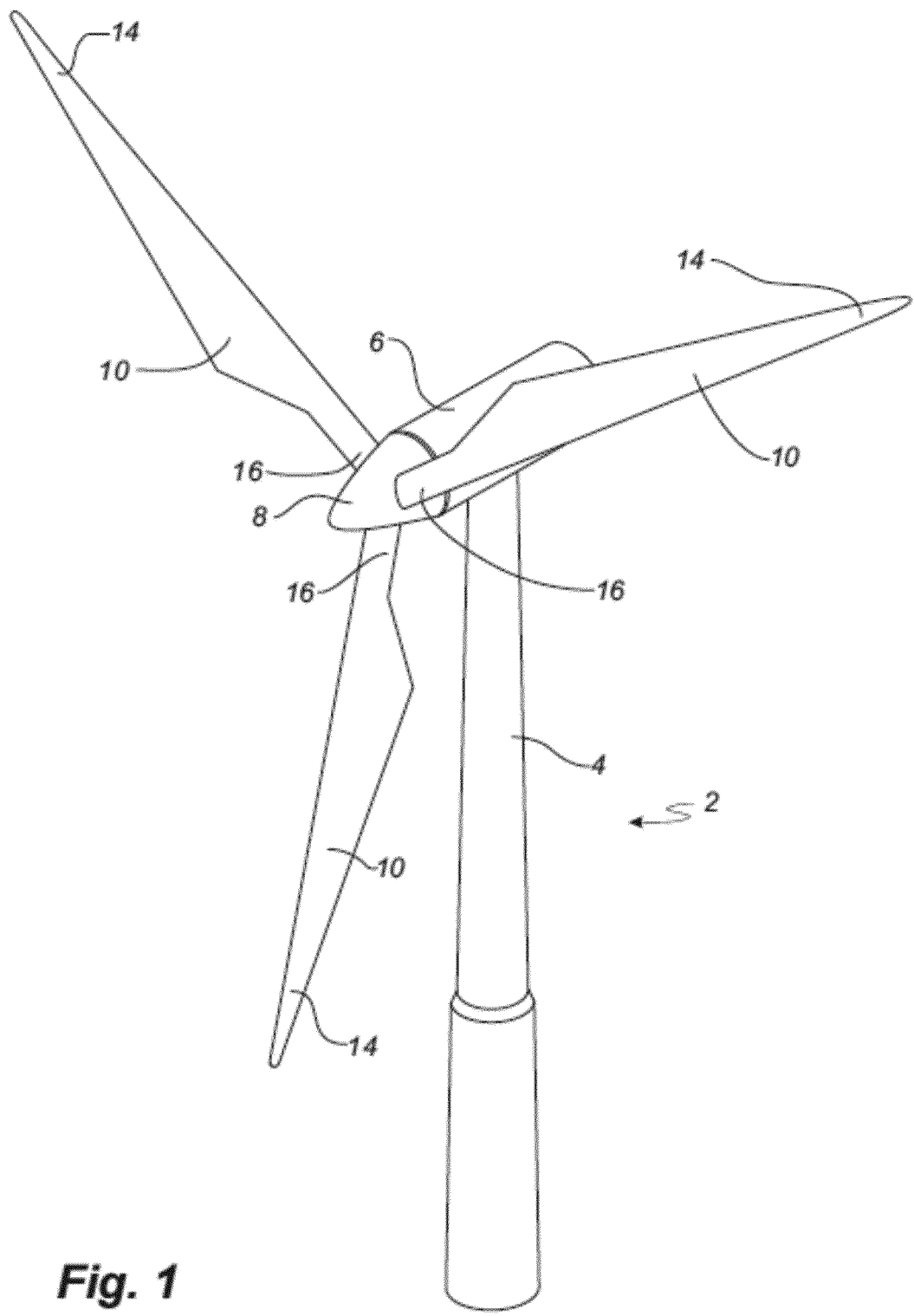
FIG. 1 is a schematic diagram illustrating an exemplary wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8, and three blades 10 extending radially from the hub 8, each having a blade root 16 nearest the hub and a blade tip 14 furthest from the hub 8.

Figure 2:
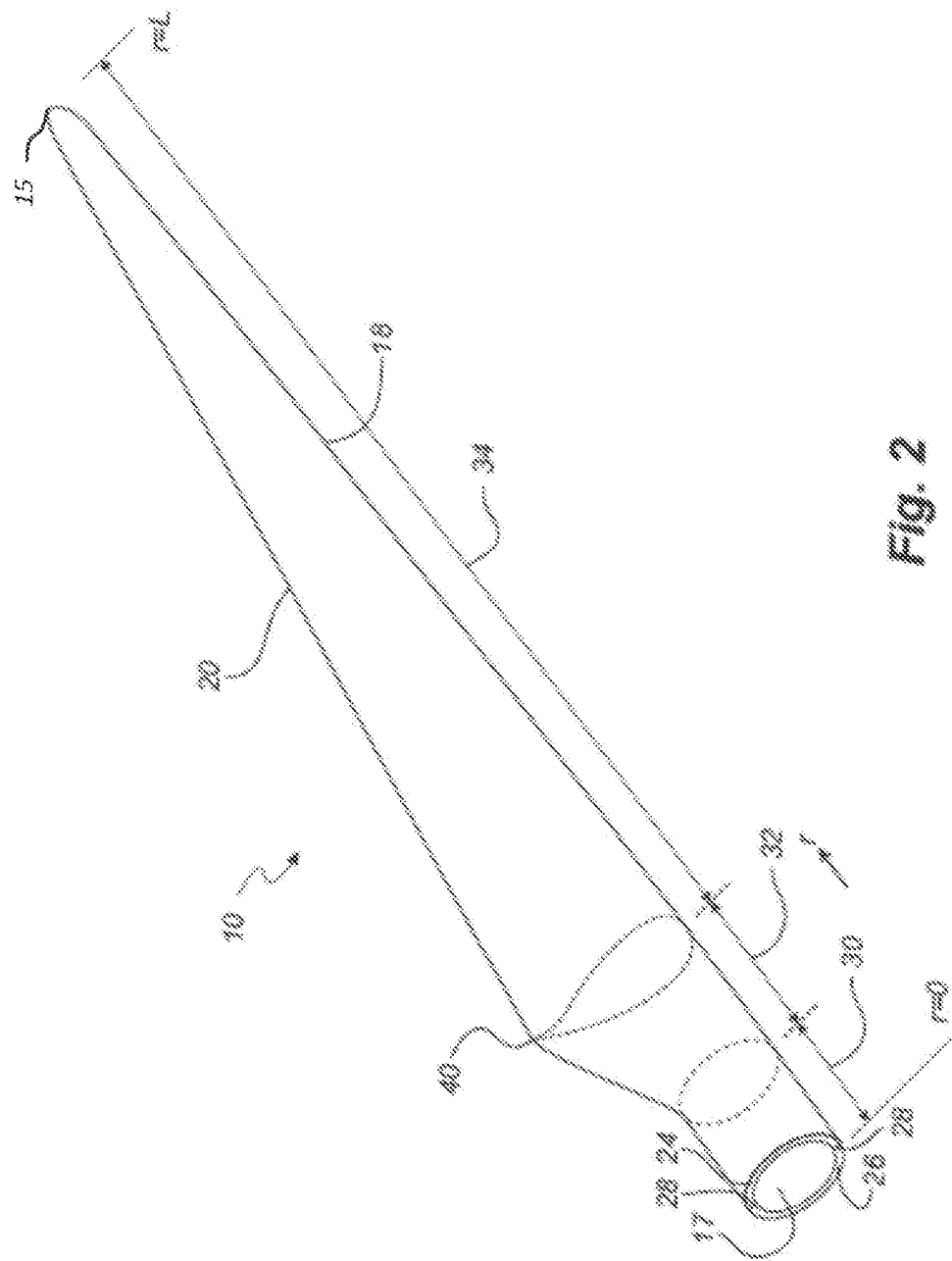
FIG. 2 is a schematic diagram illustrating an exemplary wind turbine blade.

FIG. 2 shows a schematic view of an exemplary wind turbine blade 10. The wind turbine blade 10 has the shape of a conventional wind turbine blade with a root end 17 and a tip end 15 and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 40 of the blade 10 is defined as the position, where the blade 10 has its largest chord length. The shoulder 40 is typically provided at the boundary between the transition region 32 and the airfoil region 34.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 comprises a blade shell may comprise two blade shell parts, a first blade shell part 24 and a second blade shell part 26, typically made of fibre-reinforced polymer. The first blade shell part 24 is typically a pressure side or upwind blade shell part. The second blade shell part 26 is typically a suction side or downwind blade shell part. The first blade shell part 24 and the second blade shell part are typically glued together along bond lines or glue joints 28 extending along the trailing edge 20 and the leading edge 18 of the blade 10. Typically, the root ends of the blade shell parts 24, 26 has a semi-circular or semi-oval outer cross-sectional shape.

Figure 3:
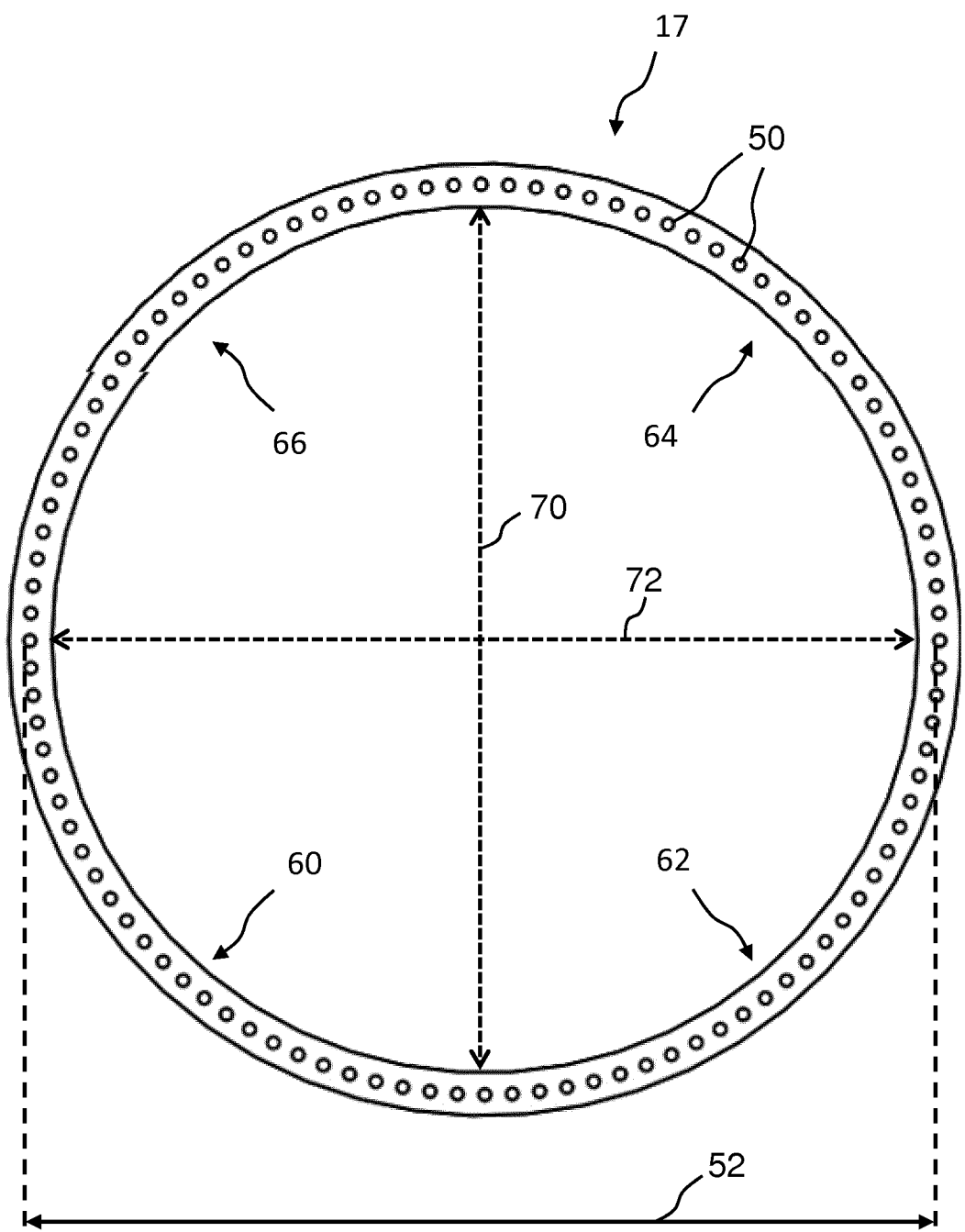
FIG. 3 is a schematic diagram illustrating a root end of an exemplary wind turbine blade.

FIG. 3 is a schematic diagram illustrating a root end 17 of an exemplary wind turbine blade. The root end 17 comprises bolt attachments 50 distributed along a bolt circle having a bolt circle diameter 52. The root end 17 comprises a first root end part 60, a second root end part 62, a third root end part 64, and a fourth root end part 66. The bolt circle diameter 52 may also be designated BCD.

The first root end part 60 and the fourth root end part 66 are on a first side of a 10 vertical diameter 70 of the bolt circle. The second root end part 62 and the third root end part 64 are on a second side (opposite the first side) of the vertical diameter 70 of the bolt circle. The first root end part 60 and the second root end part 62 are below a horizontal diameter 72 of the bolt circle. The third root end part 64 and the fourth root end part 66 are above the horizontal diameter 72 of the bolt circle.

Figure 4:
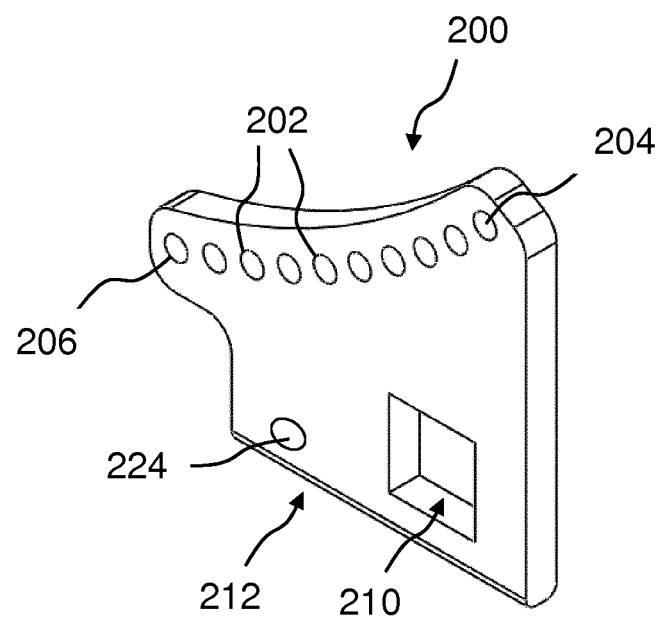
FIG. 4 is a schematic diagram illustrating an exemplary root clamping plate.
Figure 5:
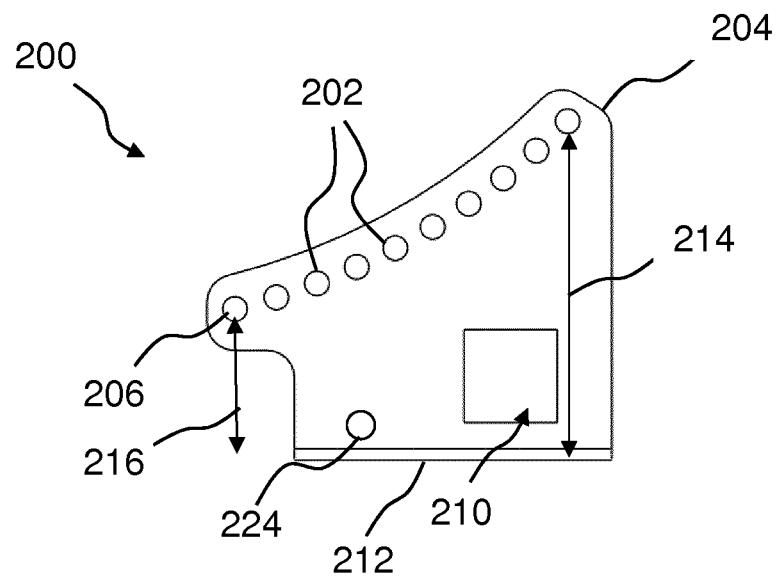
FIG. 5 is a schematic diagram illustrating an exemplary root clamping plate.

FIGS. 4 and 5 are schematic diagrams illustrating an exemplary root clamping plate 200. The root clamping plate 200 is substantially planar, and extends in a plate plane.

The root clamping plate 200 comprises a plurality of bolt holes 202. The plurality of bolt holes 202 are arranged along a circular arc from a primary bolt hole 204 to a secondary bolt hole 206. The circular arc has a diameter being the same as the bolt circle diameter of the root end of the wind turbine blade whereon the root clamping plate is configured to be attached, i.e. the radius of the circular arc and the radius of the bolt circle of bolt attachments of the root end are the same. The plurality of bolt holes 202 extends through the root clamping plate 200 perpendicularly to the plate plane. Thereby, the root clamping plate may be attached to a first root end part by facing one side of the root clamping plate towards the root end of the wind turbine blade and be attached to a second root end part by facing the opposite side of the root clamping plate towards the root end of the wind turbine blade.

A distance from the primary bolt hole 204 to the resting face 212 may be a primary distance 214. A distance from the secondary bolt hole 206 to the resting face 202 may be a secondary distance 216. The primary distance 214 may be longer than the secondary distance 216, as shown.

The root clamping plate 200 comprises a resting face 212. The resting face 212 is configured to engage with a receiver of a main root frame.

The root clamping plate 200 comprises a connector receiver 210. The connector receiver 210 is configured for connection of a clamp connector configured to be mounted on a truck for dolly transport of the wind turbine blade. The connector receiver 210 is formed by a through hole substantially perpendicular to the plate plane. Thereby, the connector receiver 210 may engaged from both sides. The connector receiver 210 may be a through hole having a rectangular shape in the plate plane, as shown. Alternatively, the connector receiver 210 may have another shape, such as an oval shape, a triangular shape, or an arbitrary shape in the plate plane, e.g. the connector receiver 210 may be asymmetric in the plate plane.

The root clamping plate 200 comprises a lock hole 224. The lock hole 224 is configured for securing the root clamping plate 200 to a receiver of a main root frame.

Figure 6:
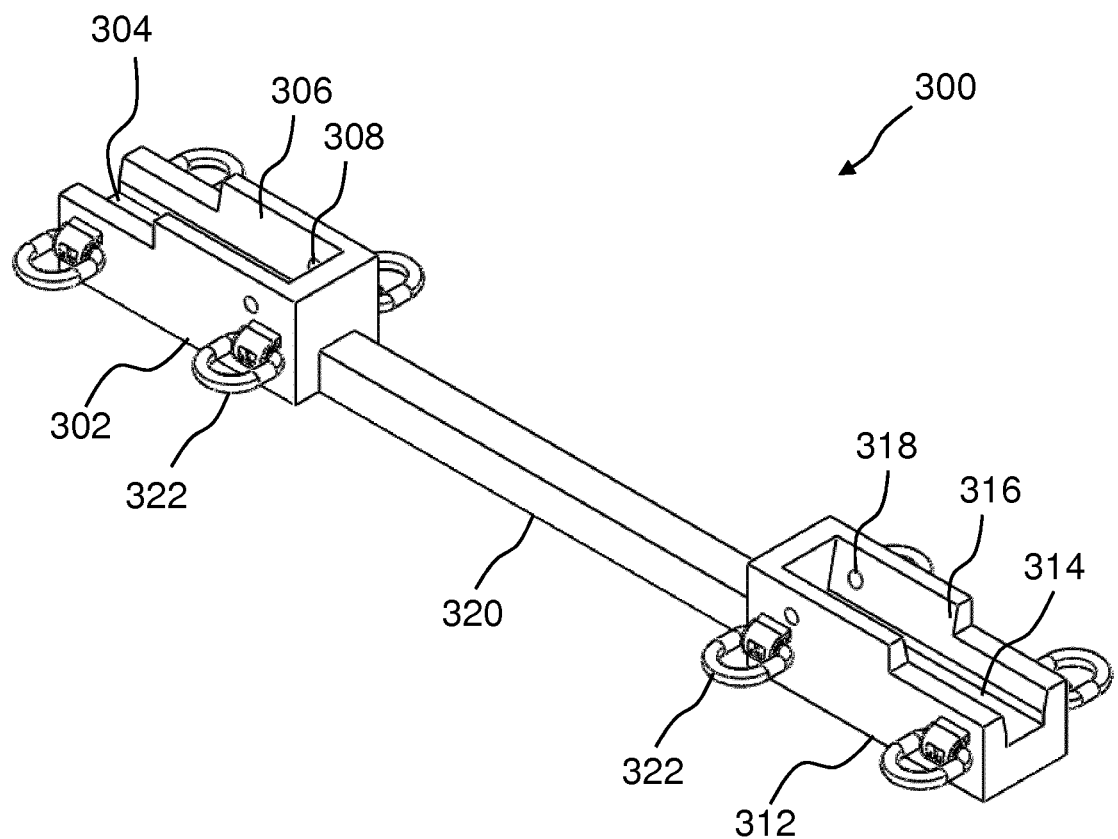
FIG. 6 is a schematic diagram illustrating an exemplary main root frame.

FIG. 6 is a schematic diagram illustrating an exemplary main root frame 300. The main root frame 300 comprises a first receiver 302, a second receiver 312, and a main connector 320. The main connector 320 is connecting the first receiver 302 and the second receiver 312. The first receiver 302 is configured for receiving a first resting face of a first root clamping plate, such as a root clamping plate in accordance with the root clamping plate of FIGS. 4 and 5. The second receiver is configured for receiving a second resting face of a second root clamping plate, such as a root clamping plate in accordance with the root clamping plate of FIGS. 4 and 5.

The first receiver 302 comprises a first bottom surface 304 and a first wall surface 306. The first wall surface 306 is configured to limit movement perpendicular to the first plate plane of the received first root clamping plate. However, the first wall surface 306 allows a limited tilting, e.g. between 1-5 degrees, of the received first root clamping plate about an axis in the first plate plane. The first wall surface 306 comprises a first receiver lock hole 308. The first receiver lock hole 308 is configured for securing the received first root clamping plate to the first receiver 302.

The second receiver 312 comprises a second bottom surface 314 and a second wall surface 316. The second wall surface 316 is configured to limit movement perpendicular to the second plate plane of the received second root clamping plate. However, the second wall surface 316 allows a limited tilting, e.g. between 1-5 degrees, of the received second root clamping plate about an axis in the second plate plane. The second wall surface 316 comprises a second receiver lock hole 318. The second receiver lock hole 318 is configured for securing the received second root clamping plate to the second receiver 312.

The main root frame comprises a plurality of shackles 322. The plurality of shackles 322 may be configured for fastening the main root frame 300 to an extendable trailer. The plurality of shackles 322 may be configured for fastening the main root frame 300 to a root frame, such as a stackable root frame, e.g. for storage of the wind turbine blade and/or for sea transport.

Figure 7:
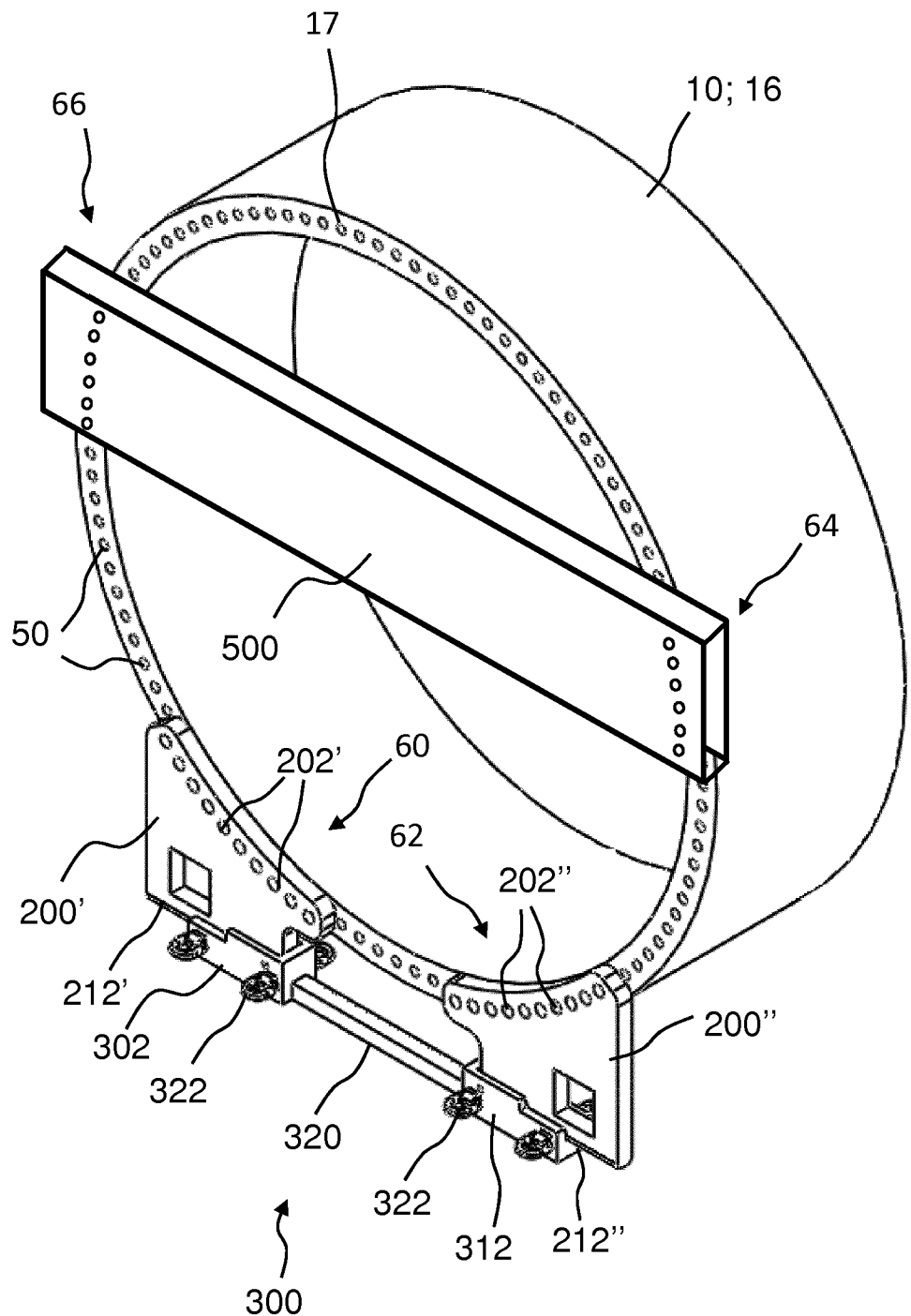
FIG. 7 is a schematic diagram illustrating parts of an exemplary transportation system.

FIG. 7 is a schematic diagram illustrating parts of an exemplary transportation system attached to a root end 17 of a root region 16 of a wind turbine blade 10.

The transportation system comprises a first root clamping plate 200', such as the root clamping plate as discussed in relation to FIGS. 4 and 5, attached to a first end part 60 of the root end 17. The transportation system comprises a second root clamping plate 200", such as the root clamping plate as discussed in relation to FIGS. 4 and 5, attached to a second end part 62 of the root end 17.

The first root clamping plate 200' is attached by aligning the first plurality of bolt holes 202' of the first root clamping plate 200' with the bolt holes 50 of first root end part 60 of the root end 17. The second root clamping plate 200" is attached by aligning the second plurality of bolt holes 202" of the second root clamping plate 200" with the bolt holes 50 of second root end part 62 of the root end 17. In some exemplary transportation system less than all of the plurality of bolt holes 202', 202" of the clamping plates 200', 200" needs to be used. The root clamping plates 200', 200" may be bolted to the root end 17. As seen the first root end part 60 is separated from the second root end part 62.

The transportation system comprises a main root frame 300. The main root frame 320 comprises a first receiver 302, a second receiver 312, and a main connector 320 connecting the first receiver 302 and the second receiver 312.

The first root clamping plate 200' comprises a first resting face 212' being received by the first receiver 302 of the main frame 300. The second root clamping plate 200" comprises a second resting face 212" being received by the second receiver 312 of the main frame 300.

The main frame 300 further comprises a plurality of shackles 322 configured for gastening the main root frame, such as to an extendable trailer and/or a root end frame.

The transportation system comprises an upper support bar 500. The upper support bar 500 is mounted to the root end 17. The upper support bar 500 is mounted to a third root end part 64 and a fourth root end part 66 of the root end 17. The upper support bar 500 may be bolted to the root end 17. The third root end part 64 is separated from the third root end part 66. The first root end part 60 and the second root end part 62 are separated from the third root end part 64 and the fourth root end part 66.

Figure 8:
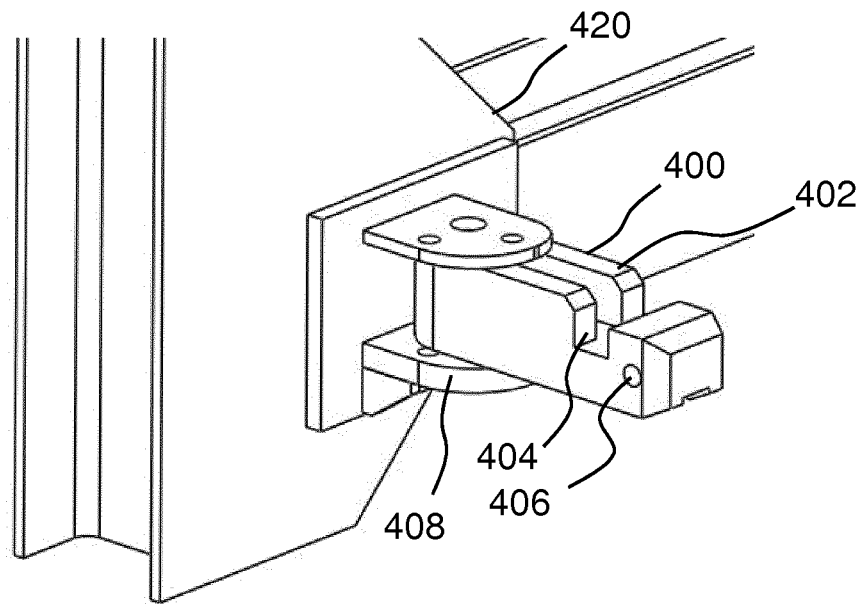
FIG. 8 is a schematic diagram illustrating an exemplary clamp connector.

FIG. 8 is a schematic diagram illustrating an exemplary clamp connector 400, such as a first clamp connector and/or a second clamp connector of an exemplary transportation system. The clamp connector 400 is mounted on a truck adaptor 420. The clamp connector 400 and the truck adaptor 420 are configured for dolly transport of the wind turbine blade. The clamp connecter 400 has an upper edge 402. The upper edge 402 has an indentation 404 configured to receive a root clamping plate. The clamp connector 400 comprises a connector lock hole 406 configured to receive a bolt, a lock pin or similar to secure the clamp connector to the clamping plate. The clamp connector 400 comprises a connector hinge 408 to allow a displacement of the clamp connector 400 relative to the truck adaptor 420.

Figure 9:
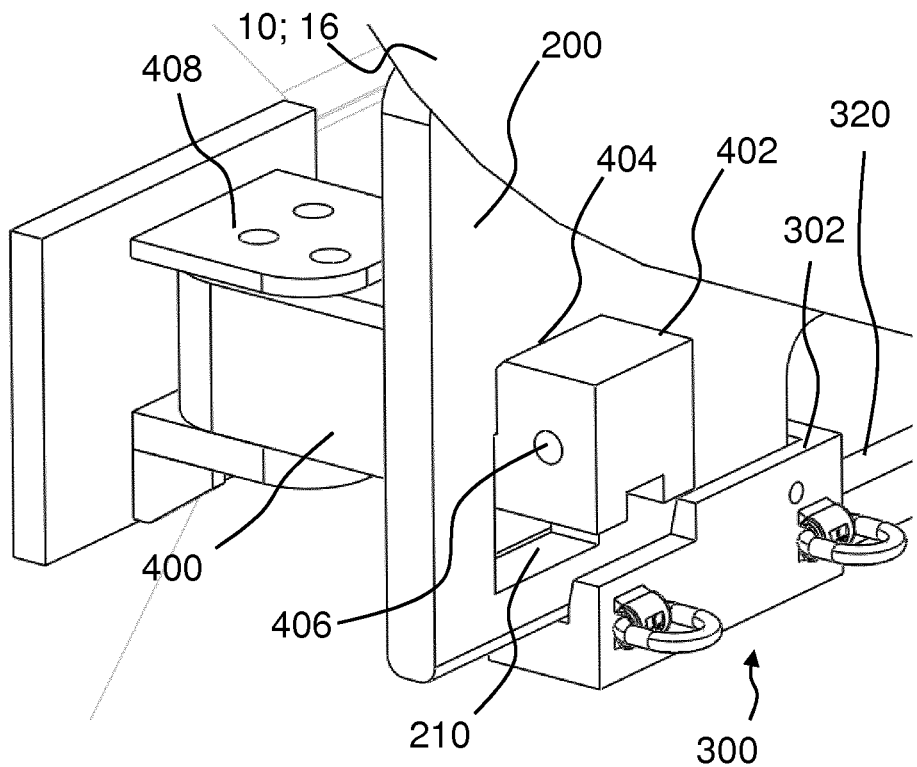
FIG. 9 is a schematic diagram illustrating an exemplary clamp connector.

FIG. 9 is a schematic diagram illustrating an exemplary clamp connector 400, such as the clamp connector as also described in relation to FIG. 8. The clamp connector 400 is engaged with a connector receiver 210 of a root clamping plate 200, such that the indentation 404 of the clamp connector 400 is aligned with the root clamping plate of the root clamping plate 200. The clamp connector 400 is engaging the connector receiver 210 by displacing the clamp connector 400 along the longitudinal axis of the wind turbine blade 10 and subsequently raising the clamp connector 400 such that the root clamping plate 200 is positioned in the indentation 404 of the clamp connector. Thereby relative movement between the clamp connector 400 and the root clamping plate 200 is restricted.

As also shown, the root clamping plate 200 is attached to a wind turbine blade 10, and the root clamping plate 200 is received in a receiver 302 of a main frame 300. The main frame 300 further comprises a main connector 320 connecting the receiver 302 with another receiver (not shown) of the main frame 300.

Figure 10:
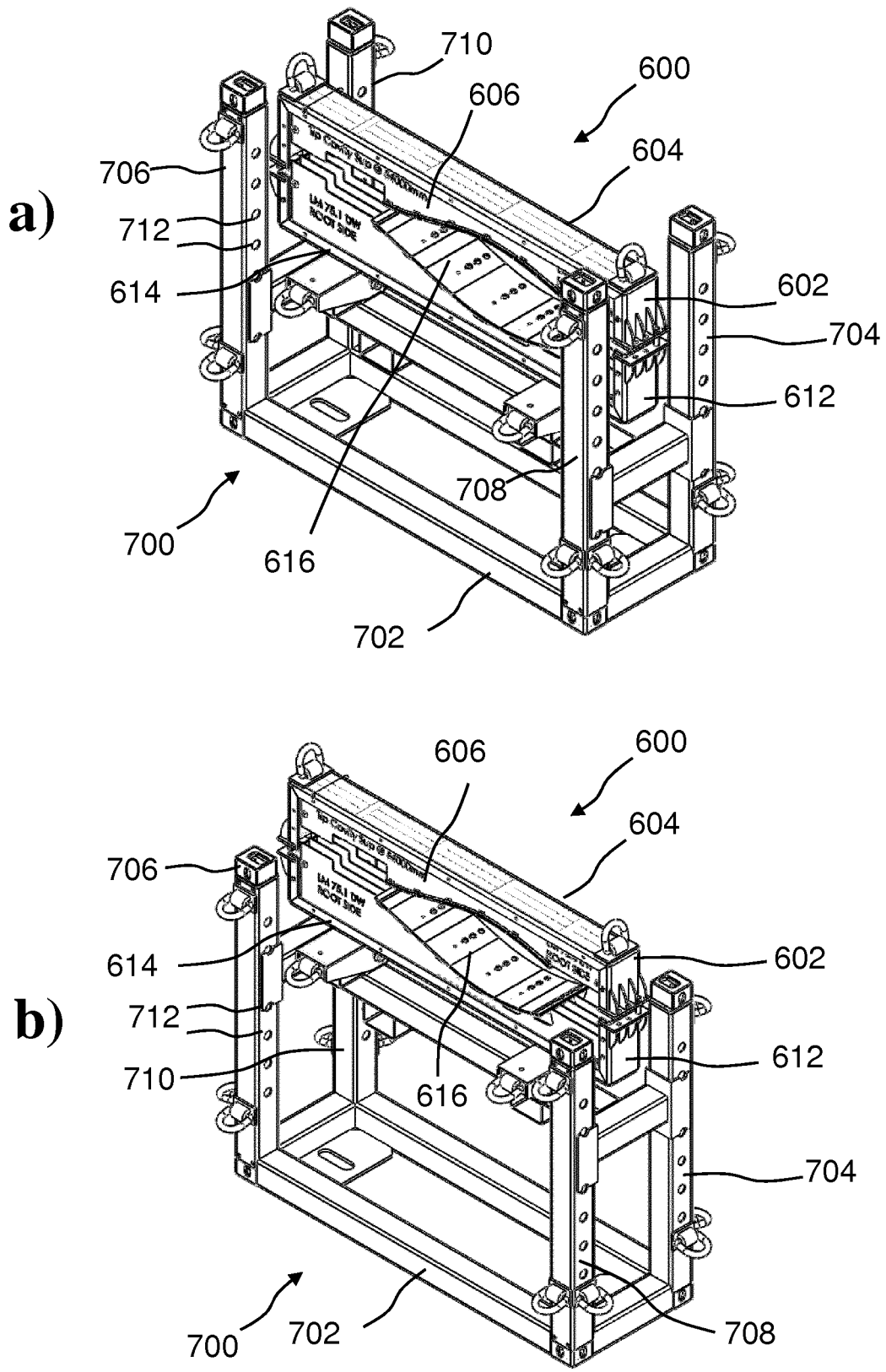
FIG. 10 is a schematic diagram illustrating an exemplary tip clamping element.

FIG. 10 is a schematic diagram illustrating an exemplary tip clamping element 600 and a tip frame 700. FIG. 10a shows the tip clamping element 600 being attached to the tip frame 700 at a first height. FIG. 10b shows the tip clamping element 600 being attached to the tip frame 700 at a second height.

The tip clamping element 600 comprises an upper clamping part 602 and a lower clamping part 612. The lower clamping part 612 and the upper clamping part 602 are releasably connected to enclose a blade clamp part of an airfoil region of a wind turbine blade.

The upper clamping part 602 comprises a upper insert receiver 604. The upper insert receiver 604 is configured to receive a upper insert 606 being formed to accommodate a upper contour of the blade clamp part. In the illustrated example, the upper insert 606 is inserted in the upper insert receiver 604.

The lower clamping part 612 comprises a lower insert receiver 614. The lower insert receiver 614 is configured to receive a lower insert 616 being formed to accommodate a lower contour of the blade clamp part. In the illustrated example, the lower insert 616 is inserted in the lower insert receiver 614.

The tip clamping element 600 may be attached to a tip frame 700 as shown. The tip frame 700 has a base tip element 702, a first vertical tip element 704, a second vertical tip element 706, a third vertical tip element 708 and a fourth vertical tip element 710. However, in another exemplary tip frame, the third vertical tip element 708 and/or the fourth vertical tip element 710 may be omitted, e.g. to save weight.

The first vertical tip element 704, the second vertical tip element 706, the third vertical tip element 708 and the fourth vertical tip element 710 are extending vertically from the base tip element 702.

The first vertical tip element 704, the second vertical tip element 706, the third vertical tip element 708 and the fourth vertical tip element 710 have a plurality of attachment positions 712. The plurality of attachment positions 712 are configured for attachment of the tip clamping element 600 at various vertical positions. In FIG. 10a, the tip clamping element 600 is attached at a first attachment position, and in FIG. 10b, the tip clamping element 600 is attached at a second attachment position. The first attachment position is at a first height and the second attachment position is at a second height above the first height. The various vertical positions may be used dependent on the specific need, e.g. depending on transportation type or other circumstances.

Figure 11:
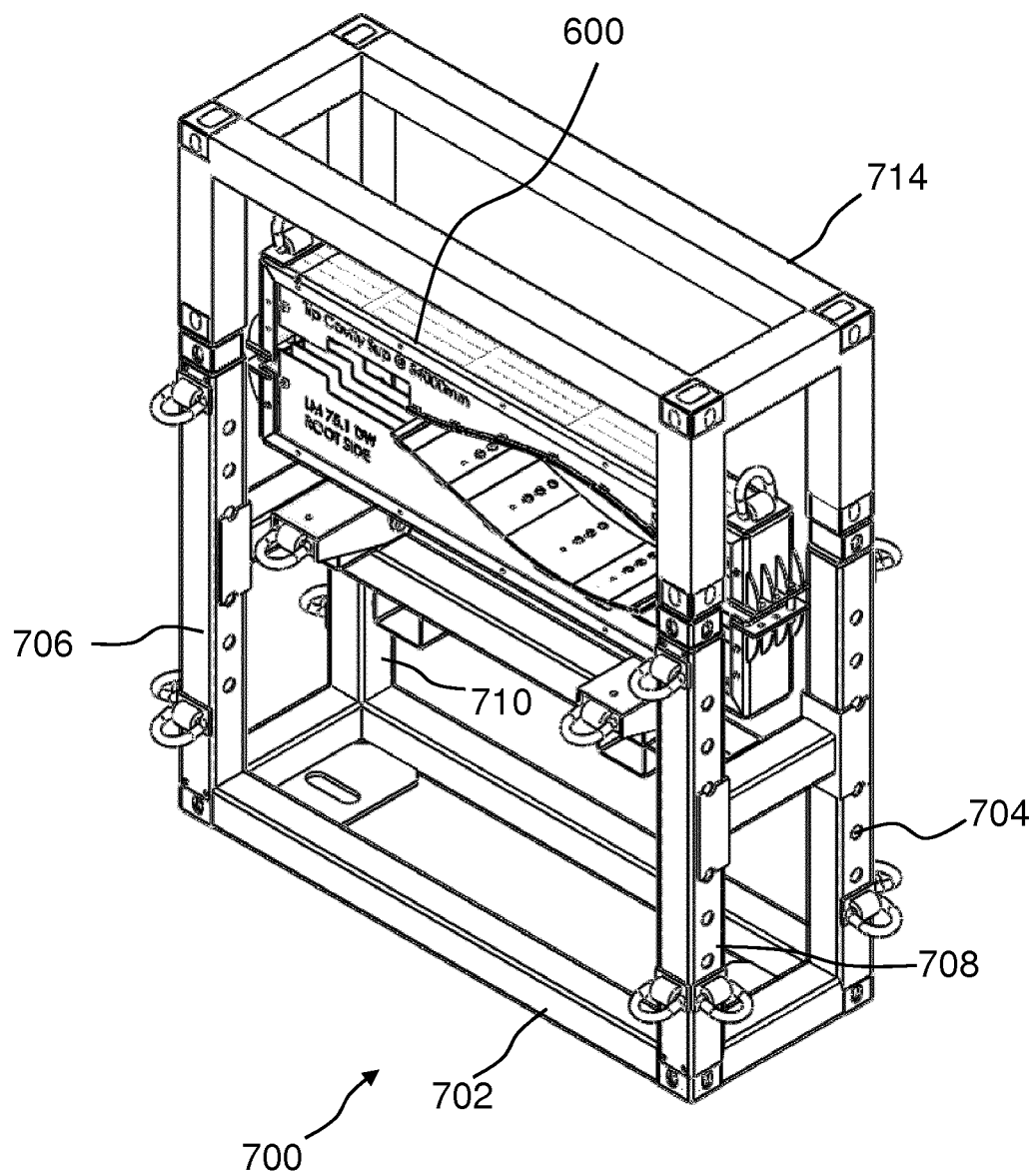
FIG. 11 is a schematic diagram illustrating an exemplary tip clamping element.

FIG. 11 is a schematic diagram illustrating an exemplary tip clamping element 600 and a tip frame 700, such as the tip clamping element and tip frame as described in relation to FIG. 10. The tip frame 700 further comprises a top tip element 714. The first vertical tip element 704, the second vertical tip element 706, the third vertical tip element 708 and the fourth vertical tip element 710 are extending vertically from the base tip element 702 to the top tip element 714.

The top tip element 714 may be configured to receive a base tip element of another tip frame on top of the top tip element. Alternatively or additionally, the top tip element 714 may be configured to receive a base root element of a root frame on top of the top tip element, e.g. if the wind turbine blades are to be stacked in alternating directions, i.e. root region above airfoil region and vice versa.

Figure 12:
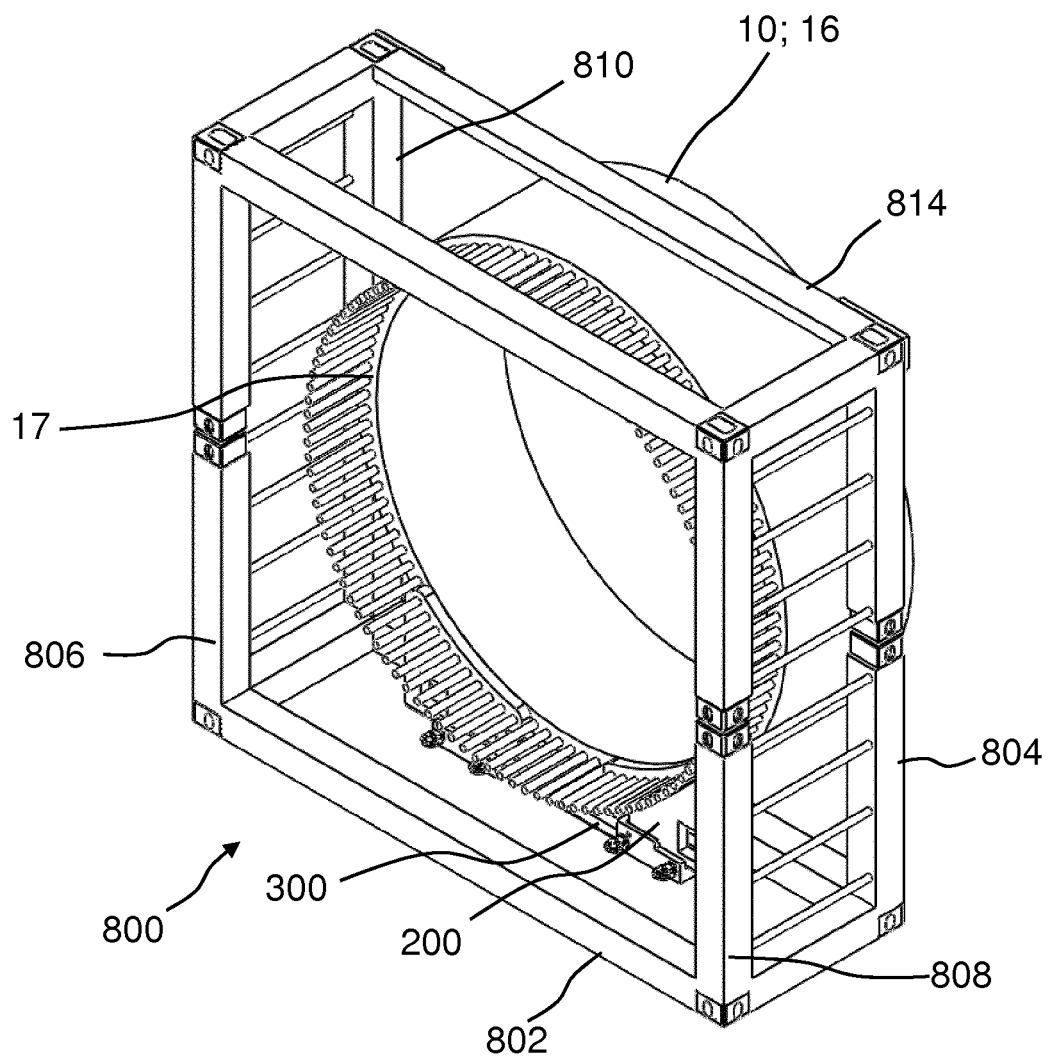
FIG. 12 is a schematic diagram illustrating parts of an exemplary transportation system.

FIG. 12 is a schematic diagram illustrating a root frame 800. The root frame 800 has a base root element 802, a first vertical root element 804, a second vertical root element 806, a third vertical root element 808 and a fourth vertical root element 810. However, in another exemplary root frame, the third vertical root element 808 and/or the fourth vertical root element 810 may be omitted, e.g. to save weight.

The first vertical root element 804, the second vertical root element 806, the third vertical root element 808 and the fourth vertical root element 810 are extending vertically from the base root element 802.

The root frame 800 comprises a top root element 814. The first vertical root element 804, the second vertical root element 806, the third vertical root element 808 and the fourth vertical root element 810 are extending vertically from the base root element 802 to the top root element 814.

The top root element 814 may be configured to receive a base root element of another root frame on top of the top root element 814. Alternatively or additionally, the top root element 814 may be configured to receive a base tip element of a tip frame on top of the top root element 814, e.g. if the wind turbine blades are to be stacked in alternating directions, i.e. root region above airfoil region and vice versa.

Also shown is a root region 16 of a wind turbine blade 10 with clamping plates 200 and main root frame 300 attached. The main root frame 300 is fastened to the base root element 802.

Figure 13:
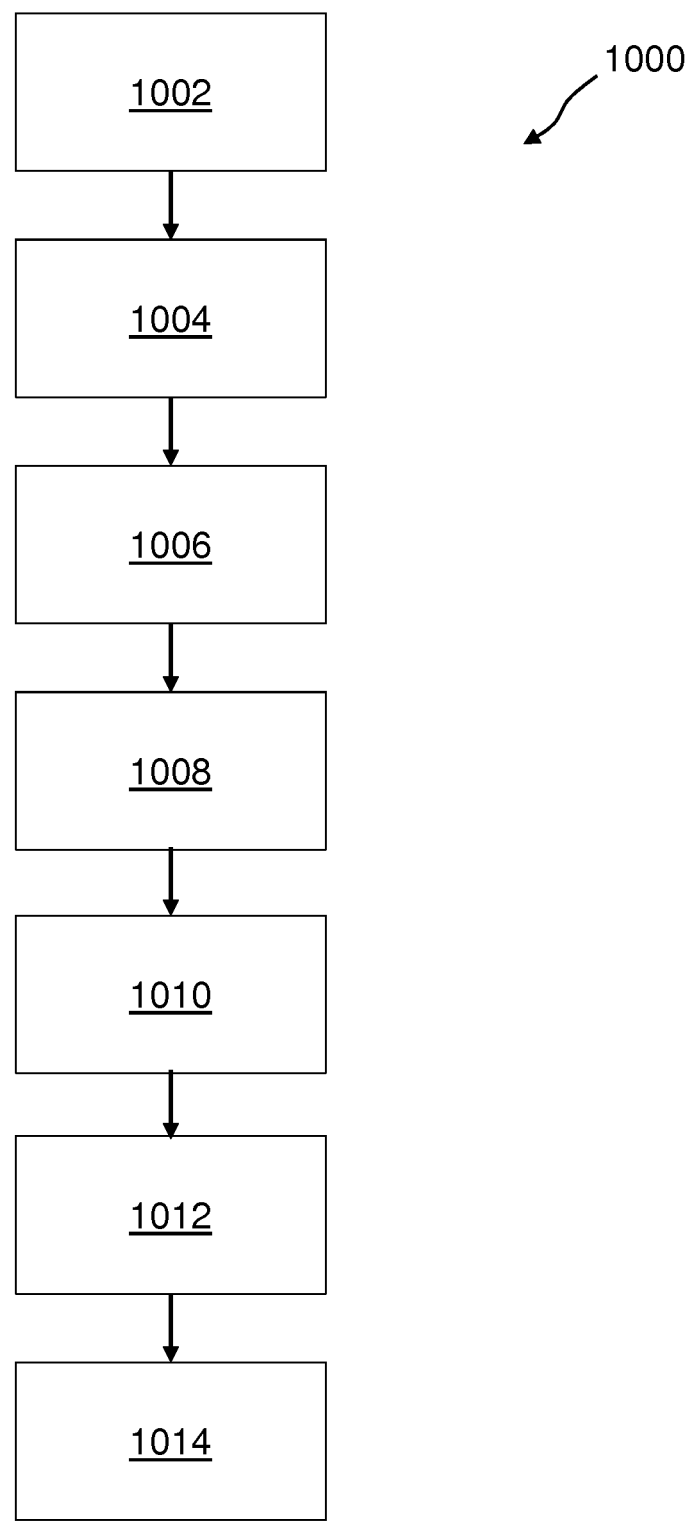
FIG. 13 is a flowchart of an exemplary method.

FIG. 13 is a flowchart of an exemplary method 1000 for transportation of a wind turbine blade.

The method 1000 comprises attaching 1002 a first root clamping plate to a first root end part of the root end. For example, the first root clamping plate may be bolted to the bolt attachments of the first root end part.

The method 1000 comprises attaching 1004 a second root clamping plate to a second root end part of the root end. For example, the second root clamping plate may be bolted to the bolt attachments of the second root end part.

The second root clamping plate may be attached before the first root clamping plate is attached, or the first root clamping plate may be attached before the second root clamping plate is attached, or they may be attached simultaneously. The root clamping plates may be attached to the root end after finishing of production of the wind turbine blade, e.g. at the production site.

The method 1000 comprises engaging 1006 the first root clamping plate and the second root clamping plate with a first transportation type. For example, the first root clamping plate and the second root clamping plate, e.g. after being attached to the root end of the wind turbine blade, may be engaged in dolly transport of the wind turbine blade, e.g. by engaging the first and second root clamping plates with clamp connectors attached to a truck adaptor for dolly transport.

The method 1000 comprises transporting 1008 the wind turbine blade by the first transportation type. For example, by dolly transport.

The method 1000 comprises disengaging 1010 the first root clamping plate and the second root clamping plate from the first element, such as after transporting 1008 by the first transportation type. For example, transporting 1008 by the first transportation type may have transported the wind turbine blade from the production site to a harbour. At the harbour the clamping plates may be disengaged 1010 from the first transportation type, e.g. in order to be able to load the wind turbine blade on a ship for ship transportation.

The method 1000 comprises engaging 1012 the first root clamping plate and the second root clamping plate with a second transportation type. For example, the root clamping plate may be engaged with a root frame for sea transport, e.g. in order to allow a plurality of wind turbine blades to be stacked on top of each other.

The method 1000 may comprise, as illustrated, transporting the wind turbine blade by the second transportation type. For example, the wind turbine blare may be sailed to another destination, such another harbour and/or an off shore wind farm.

The attached clamping plates may be maintained attached to the wind turbine blade until the wind turbine blade arrives at its final destination. Thus, changing between mode of transportation may be made more easy, and the need for unmounting and mounting of different elements to the wind turbine blade may be limited and time may be saved during transport.

The disclosure has been described with reference to a preferred embodiment. However, the scope of the invention is not limited to the illustrated embodiment, and alterations and modifications can be carried out without deviating from the scope of the invention.

Exemplary root clamping plates, transportation systems, and methods for transportation are disclosed in the following items:

1. A root clamping plate for a transportation system configured for transportation of a wind turbine blade having a longitudinal axis and comprising a root end, a root region, an airfoil region with a tip, a pressure side, a suction side and a chord line extending between a leading edge and a trailing edge, the root end comprising bolt attachments distributed along a bolt circle having a bolt circle diameter, the root clamping plate extending in a plate plane and comprising:
    a plurality of bolt holes arranged along a circular arc from a primary bolt hole to a secondary bolt hole, the circular arc having a diameter being the same as the bolt circle diameter, the plurality of bolt holes being configured for attachment of the root clamping plate to a root end part of the root end,
    a resting face configured to engage with a receiver of a main root frame,
    the root clamping plate being configured for a first transportation type, and the root clamping plate being configured for a second transportation type.
2. Root clamping plate according to item 1, wherein the circular arc extends less than 45 degrees from the primary bolt hole to the secondary bolt hole.
3. Root clamping plate according to any of the preceding items, wherein each of the plurality of bolt holes extends through the root clamping plate perpendicularly to the plate plane.
4. Root clamping plate according to any of the preceding items, having a primary distance from the primary bolt hole to the resting face and a secondary distance from the secondary bolt hole to the resting face, the primary distance being longer than the secondary distance.
5. Root clamping plate according to any of the preceding items comprising a secondary plurality of bolt holes arranged along a secondary circular arc from a primary bolt hole to a secondary bolt hole, the secondary circular arc having a diameter other than the diameter of the circular arc.
6. Root clamping plate according to any of the preceding items, wherein the first transportation type is dolly transport and the second transportation type is extendable trailer transport or sea transport, or wherein the first transportation type is extendable trailer transport and the second transportation type is dolly transport or sea transport.
7. Root clamping plate according to any of the preceding items comprising a connector receiver configured for connection of a clamp connector configured to be mounted on a truck for dolly transport of the wind turbine blade.
8. Root clamping plate according to item 7, wherein the connector receiver is formed by a through hole substantially perpendicular to the plate plane.
9. Root clamping plate according to any of items 7-8, wherein the connector receiver is formed by a through hole having a rectangular shape in the plate plane.
10. Root clamping plate according to any of the preceding items, wherein the root clamping plate is a rigid structure.
11. Root clamping plate according to any of the preceding items comprising a lock hole configured for securing the root clamping plate to the receiver of the main root frame.
12. Transportation system for transportation of a wind turbine blade having a longitudinal axis and comprising a root end, a root region, an airfoil region with a tip, a pressure side, a suction side and a chord line extending between a leading edge and a trailing edge, the root end comprising bolt attachments distributed along a bolt circle having a bolt circle diameter, the transportation system comprising:
    a first root clamping plate extending in a first plate plane and comprising:
        a first plurality of bolt holes arranged along a first circular arc from a first primary bolt hole to a first secondary bolt hole, the first circular arc having a diameter being the same as the bolt circle diameter, the first plurality of bolt holes being configured for attachment of the first root clamping plate to a first root end part of the root end,
        a first resting face configured to engage with a first receiver of a main root frame,
    a second root clamping plate extending in a second plate plane and comprising:

a second plurality of bolt holes arranged along a second circular arc from a second primary bolt hole to a second secondary bolt hole, the second circular arc having a diameter being the same as the bolt circle diameter, the second plurality of bolt holes being configured for attachment of the second root clamping plate to a second root end part of the root end, a second resting face configured to engage with a second receiver of the main root frame, the transportation system being configured for a first transportation type, and the transportation system being configured for a second transportation type.

13. Transportation system according to item 12 comprising the main root frame comprising the first receiver for receiving the first resting face of the first root clamping plate, the second receiver for receiving the second resting face of the second root clamping plate, and a main connector connecting the first receiver and the second receiver.

14. Transportation system according to item 13, wherein the first receiver comprises a first bottom surface and a first wall surface, the first wall surface limiting movement perpendicular to the first plate plane of the received first root clamping plate, and wherein the second receiver comprises a second bottom surface and a second wall surface, the second wall surface limiting movement perpendicular to the second plate plane of the received second root clamping plate.

15. Transportation system according to item 14, wherein the first wall surface allows a limited tilting of the received first root clamping plate about an axis in the first plate plane, and wherein the second wall surface allows the limited tilting of the received second root clamping plate about an axis in the second plate plane, the limited tilting being between 1-5 degrees.

16. Transportation system according to any of items 14-15, wherein the first wall surface comprises a first receiver lock hole configured for securing the received first root clamping plate to the first receiver, and wherein the second wall surface comprises a second receiver lock hole configured for securing the received second root clamping plate to the second receiver.

17. Transportation system according to any of items 13-16, wherein the main root frame comprises a plurality of shackles configured for fastening the main root frame to an extendable trailer.

18. Transportation system according to any of items 13-17, wherein the main root frame is configured to provide stiffening, e.g. when the transportation system is used for dolly transport.

19. Transportation system according to any of items 13-19, wherein the main root frame is configured to be fastened to an extendable trailer and/or configured to be fastened to a root frame, e.g. for sea transport.

20. Transportation system according to any of items 12-19 comprising a first clamp connector and a second clamp connector configured to be mounted on a truck adaptor for dolly transport of the wind turbine blade, the first clamp connecter being configured for connection to a first connector receiver of the first root clamping plate, the second clamp connector being configured for connection to a second connector receiver of the second root clamping plate.

21. Transportation system according to item 20, wherein the first clamp connecter has an upper edge with a first indentation, the first clamp connector being configured to engage the first connector receiver, such that the first indentation is aligned with the first root clamping plate, and wherein the second clamp connecter has an upper edge with a second indentation, the second clamp connector being configured to engage the second connector receiver, such that the second indentation is aligned with the second root clamping plate.

22. Transportation system according to any of items 12-21 comprising an upper support bar configured to be mounted between a truck adaptor for dolly transport and a third root end part and a fourth root end part of the root end.

23. Transportation system according to any of items 12-22 comprising a tip clamping element comprising an upper clamping part and a lower clamping part, the lower clamping part and the upper clamping part being releasably connected to enclose a blade clamp part of the airfoil region of the wind turbine blade.

24. Transportation system according to item 23, wherein the lower clamping part comprises a lower insert receiver configured to receive a lower insert being formed to accommodate a lower contour of the blade clamp part.

25. Transportation system according to any of items 23-24, wherein the upper clamping part comprises an upper insert receiver configured to receive an upper insert being formed to accommodate an upper contour of the blade clamp part.

26. Transportation system according to any of items 23-25 comprising a tip frame having a base tip element, a first vertical tip element and a second vertical tip element, the first vertical tip element and second vertical tip element extending vertically from the base tip element, the first vertical tip element and the second vertical tip element having a plurality of attachment positions including a first attachment position and a second attachment position, the plurality of attachment positions being configured for attachment of the tip clamping element, the first attachment position being at a first height and the second attachment position being at a second height, the second height being above the first height.

27. Transportation system according to item 26, wherein the tip frame is configured to be positioned on top of another frame, such as a root frame or a tip frame and/or wherein the tip frame is configured to receive another frame, such as a root frame or a tip frame, positioned on top of the tip frame.

28. Transportation system according to any of items 26-27, wherein the tip frame comprises a top tip element, and the first vertical tip element and second vertical tip element extending vertically from the base tip element to the top tip element, wherein the top tip element is configured to receive a base tip element of another tip frame on top of the top tip element and/or wherein the top tip element is configured to receive a base root element of a root frame on top of the top tip element.

29. Transportation system according to any of items 12-28 comprising a root frame having a base root element, a first vertical root element and a second vertical root element, and wherein the main root frame is configured to be fastened to the base root element.

30. Transportation system according to item 29, wherein the root frame is configured to be positioned on top of another frame, such as a root frame or a tip frame and/or wherein the root frame is configured to receive another frame, such as a root frame or a tip frame, positioned on top of the root frame.

31. Transportation system according to any of items 29-30, wherein the root frame comprises a top root element, and the first vertical root element and second vertical root element extending vertically from the base root element to the top root element, wherein the top root element is configured to receive a base tip element of a tip frame on top of the top root element and/or wherein the top root element is configured to receive a base root element of another root frame on top of the top root element.

32. A method for transportation of a wind turbine blade having a longitudinal axis and comprising a root end, a root region, an airfoil region with a tip, a pressure side, a suction side and a chord line extending between a leading edge and a trailing edge, the root end comprising bolt attachments distributed along a bolt circle having a bolt circle diameter, the method comprising:
attaching a first root clamping plate to a first root end part of the root end;
attaching a second root clamping plate to a second root end part of the root end;
engaging the first root clamping plate and the second root clamping plate with a first transportation type;
transporting the wind turbine blade by the first transportation type;
disengaging the first root clamping plate and the second root clamping plate from the first transportation type;
engaging the first root clamping plate and the second root clamping plate with a second transportation type.

LIST OF REFERENCES 2 wind turbine
4 tower
6 nacelle
8 hub
10 blade
14 blade tip
15 tip end
16 blade root
17 root end
18 leading edge
20 trailing edge
24 first blade shell part
26 second blade shell part
28 bond lines/glue joints
30 root region
32 transition region
34 airfoil region
50 bolt attachment
50 bolt circle diameter
60 first root end part
62 second root end part
64 third root end part
66 fourth root end part
70 vertical diameter
70 horizontal diameter
200 root clamping plate
202 bolt holes
204 primary bolt hole
206 secondary bolt hole
210 connector receiver
212 resting face
214 primary distance
216 secondary distance
224 lock hole
300 main root frame
302 first receiver
304 first bottom surface
306 first wall surface
308 first receiver lock hole
312 second receiver
314 second bottom surface
316 second wall surface
318 first receiver lock hole
320 main connector
322 shackle
400 clamp connector
402 upper edge
404 indentation
406 connector lock hole
408 connector hinge
420 truck adaptor
500 upper support bar
600 tip clamping element
602 upper clamping part
604 upper insert receiver
606 upper insert
612 lower clamping part
614 lower insert receiver
616 lower insert
700 tip frame
702 base tip element
704 first vertical tip element
706 second vertical tip element
708 third vertical tip element
710 fourth vertical tip element
712 attachment positions
714 top tip element
800 root frame
802 base root element
804 first vertical root element
806 second vertical root element
808 third vertical root element
810 fourth vertical root element
814 top root element
1000 method
1002 attaching first root clamping plate
1004 attaching second root clamping plate
1006 engaging with first transportation type
1008 transporting by first transportation type
1010 disengaging from first element
1012 engaging with second transportation type
1014 transporting by second transportation type

The invention claimed is:

1. A transportation system for transportation of a wind turbine blade having a longitudinal axis and comprising a root end, a root region, an airfoil region with a tip, a pressure side, a suction side and a chord line extending between a leading edge and a trailing edge, the root end comprising bolt attachments distributed along a bolt circle having a bolt circle diameter, the root end comprising a first root end part on a first side of a vertical diameter of the bolt circle and below a horizontal diameter of the bolt circle, the root end comprising a second root end part on a second side of the vertical diameter of the bolt circle and below the horizontal diameter of the bolt circle, the first root end part and the second root end part being separated, the transportation system comprising:
a main root frame comprising a first receiver, a second receiver and a main connector connecting the first receiver and the second receiver;

a first root clamping plate extending in a first plate plane and comprising:
- a first plurality of bolt holes arranged along a first circular arc from a first primary bolt hole to a first secondary bolt hole, the first circular arc having a diameter being the same as the bolt circle diameter, the first plurality of bolt holes being configured for attachment of the first root clamping plate to the first root end part of the root end; and
- a first resting face received by the first receiver of the main root frame; and a second root clamping plate extending in a second plate plane and comprising:
- a second plurality of bolt holes arranged along a second circular arc from a second primary bolt hole to a second secondary bolt hole, the second circular arc having a diameter being the same as the bolt circle diameter, the second plurality of bolt holes being configured for attachment of the second root clamping plate to the second root end part of the root end, and
- a second resting face received by the second receiver of the main root frame, wherein the transportation system is configured for a first transportation type, and the transportation system is further configured for a second transportation type, wherein the first receiver comprises a first bottom surface and a first wall surface, the first wall surface limiting movement perpendicular to the first plate plane of the received first root clamping plate, and wherein the second receiver comprises a second bottom surface and a second wall surface, the second wall surface limiting movement perpendicular to the second plate plane of the received second root clamping plate, and wherein the first wall surface allows a limited tilting of the received first root clamping plate about an axis in the first plate plane, and wherein the second wall surface allows limited tilting of the received second root clamping plate about an axis in the second plate plane, the limited tilting of the received first and second root clamping plates each being between 1° and 5°.

2. The transportation system according to claim 1, wherein the first circular arc extends less than 45 degrees from the first primary bolt hole to the first secondary bolt hole and wherein the second circular arc extends less than 45 degrees from the second primary bolt hole to the second secondary bolt hole.

3. The transportation system according to claim 1, wherein the first root end part and the second root end part are separated by at least 10 degrees.

4. The transportation system according to claim 1, wherein each of the first plurality of bolt holes extends through the first root clamping plate perpendicularly to the first plate plane, and wherein each of the second plurality of bolt holes extends through the second root clamping plate perpendicularly to the second plate plane.

5. The transportation system according to claim 1, wherein the first root clamping plate has a first primary distance from the first primary bolt hole to the first resting face and a first secondary distance from the first secondary bolt hole to the first resting face, the first primary distance being longer than the first secondary distance, and wherein the second root clamping plate has a second primary distance from the second primary bolt hole to the second resting face and a second secondary distance from the second secondary bolt hole to the second resting face, the second primary distance being longer than the second secondary distance.

6. The transportation system according to claim 1, wherein the first root clamping plate comprises a first connector receiver configured for connection of a first clamp connector and the second root clamping plate comprises a second connector receiver configured for connection of a second clamp connector, the first clamp connector and the second clamp connector being configured to be mounted on a truck for dolly transport of the wind turbine blade.

7. The transportation system according to claim 1, wherein the first root clamping plate and the second root clamping plate are rigid structures.

8. The transportation system according to claim 1, wherein the first root clamping plate comprises a first lock hole configured for securing the first root clamping plate to the first receiver of the main root frame, and the second root clamping plate comprises a second lock hole configured for securing the second root clamping plate to the second receiver of the main root frame.

9. The transportation system according to claim 1, further comprising a tip clamping element comprising an upper clamping part and a lower clamping part, the lower clamping part and the upper clamping part being releasably connected to enclose a blade clamp part of the airfoil region of the wind turbine blade.

10. The transportation system according to claim 9, wherein the lower clamping part comprises a lower insert receiver configured to receive a lower insert being formed to accommodate a lower contour of the blade clamp part, and/or wherein the upper clamping part comprises an upper insert receiver configured to receive an upper insert being formed to accommodate an upper contour of the blade clamp part.

11. The transportation system according to claim 9, further comprising a tip frame having a base tip element, a first vertical tip element and a second vertical tip element,
- the first vertical tip element and second vertical tip element extending vertically from the base tip element, and
- the first vertical tip element and the second vertical tip element having a plurality of attachment positions including a first attachment position and a second attachment position, the plurality of attachment positions being configured for attachment of the tip clamping element, the first attachment position being at a first height and the second attachment position being at a second height, the second height being above the first height.

12. A method for transportation of a wind turbine blade, the method comprising:
- providing the transportation system according to claim 1;
- attaching the first root clamping plate to the first root end part of the root end;
- attaching the second root clamping plate to the second root end part of the root end;
- following the step of attaching the first root clamping plate to the first root end part of the root end and following the step of attaching the second root clamping plate to the second root end part of the root end, engaging the first root clamping plate and the second root clamping plate with the first transportation type;
- transporting the wind turbine blade by the first transportation type;

disengaging the first root clamping plate and the second root clamping plate from the first transportation type; and engaging the first root clamping plate and the second root clamping plate with the second transportation type.

\* \* \* \* \*